(12) United States Patent
Hendriks et al.

(10) Patent No.: US 11,794,562 B2
(45) Date of Patent: Oct. 24, 2023

(54) HYDROGEN TANK AND TRACTION BATTERY ARRANGEMENT

(71) Applicant: Volvo Truck Corporation, Gothenburg (SE)

(72) Inventors: Jan Hendriks, Västra Frölunda (SE); Anders Olsson, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 119 days.

(21) Appl. No.: 17/482,689

(22) Filed: Sep. 23, 2021

(65) Prior Publication Data
US 2022/0105791 A1    Apr. 7, 2022

(30) Foreign Application Priority Data
Oct. 6, 2020    (EP) ..................................... 20200298

(51) Int. Cl.
| | |
|---|---|
| *B60K 1/00* | (2006.01) |
| *B60L 50/60* | (2019.01) |
| *B60K 1/04* | (2019.01) |
| *B60K 15/063* | (2006.01) |
| *B60K 15/03* | (2006.01) |

(52) U.S. Cl.
CPC .................. *B60K 1/00* (2013.01); *B60K 1/04* (2013.01); *B60K 15/063* (2013.01); *B60L 50/66* (2019.02); *B60K 2015/03315* (2013.01)

(58) Field of Classification Search
CPC .......... B60K 1/00; B60K 1/04; B60K 15/063; B60K 2015/03315; B60K 15/07; B60L 50/66
See application file for complete search history.

(56) References Cited

U.S. PATENT DOCUMENTS

| | | | | |
|---|---|---|---|---|
| 6,923,282 B2 * | 8/2005 | Chernoff | ................. | B60L 50/66 180/65.265 |
| 7,614,473 B2 * | 11/2009 | Ono | ........................ | B60L 1/003 180/291 |

(Continued)

FOREIGN PATENT DOCUMENTS

| | | |
|---|---|---|
| CN | 205292313 U | 6/2016 |
| CN | 108557703 A | 9/2018 |
| JP | 2003291655 A | 10/2003 |

OTHER PUBLICATIONS

Extended European Search Report for European Patent Application No. 20200298.6, dated Dec. 18, 2020, 9 pages.

*Primary Examiner* — Jason D Shanske
*Assistant Examiner* — James J Triggs
(74) *Attorney, Agent, or Firm* — Withrow & Terranova, PLLC

(57) ABSTRACT

The invention relates to a vehicle comprising a chassis having an upper frame plate and a lower frame plate. Between the upper frame plate and the lower frame plate there is provided a traction battery pack arrangement comprising one or more battery modules, and a hydrogen tank structure comprising one or more hydrogen tanks. The hydrogen tank structure is vertically tightened to the traction battery pack arrangement, so that one of the hydrogen tank structure and said traction battery pack arrangement is located on top of the other. At least one of the hydrogen tank structure and the traction battery pack arrangement is tightened to one of the upper and lower frame plates.

15 Claims, 6 Drawing Sheets

(56) References Cited

U.S. PATENT DOCUMENTS

| | | |
|---|---|---|
| 8,479,857 B2 | 7/2013 | Tamura |
| 10,507,736 B2 * | 12/2019 | Katano ............... H01M 16/006 |
| 10,589,788 B1 * | 3/2020 | Milton .................. B62D 21/02 |
| 11,110,785 B2 * | 9/2021 | Koike ...................... B60K 1/04 |

* cited by examiner

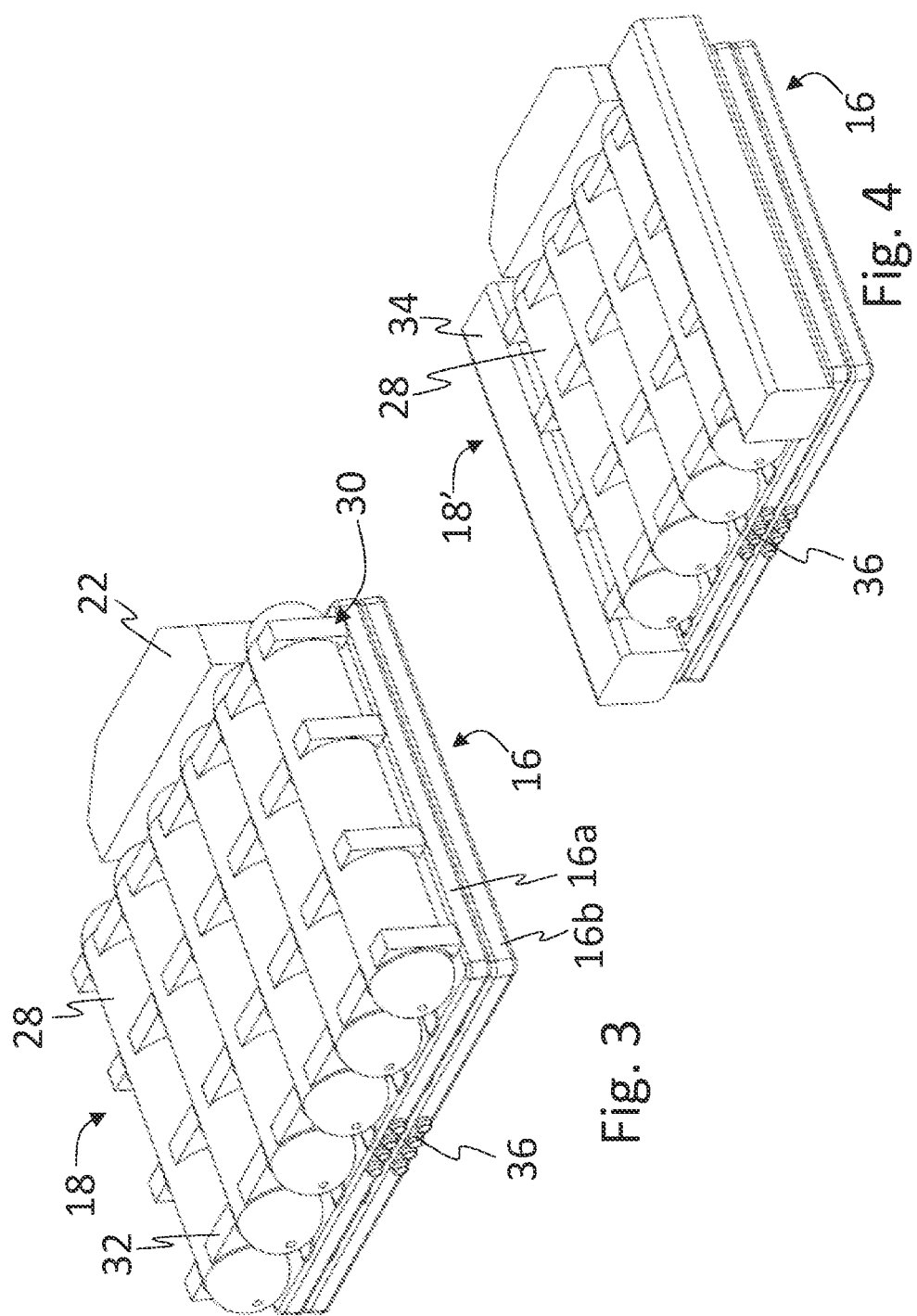

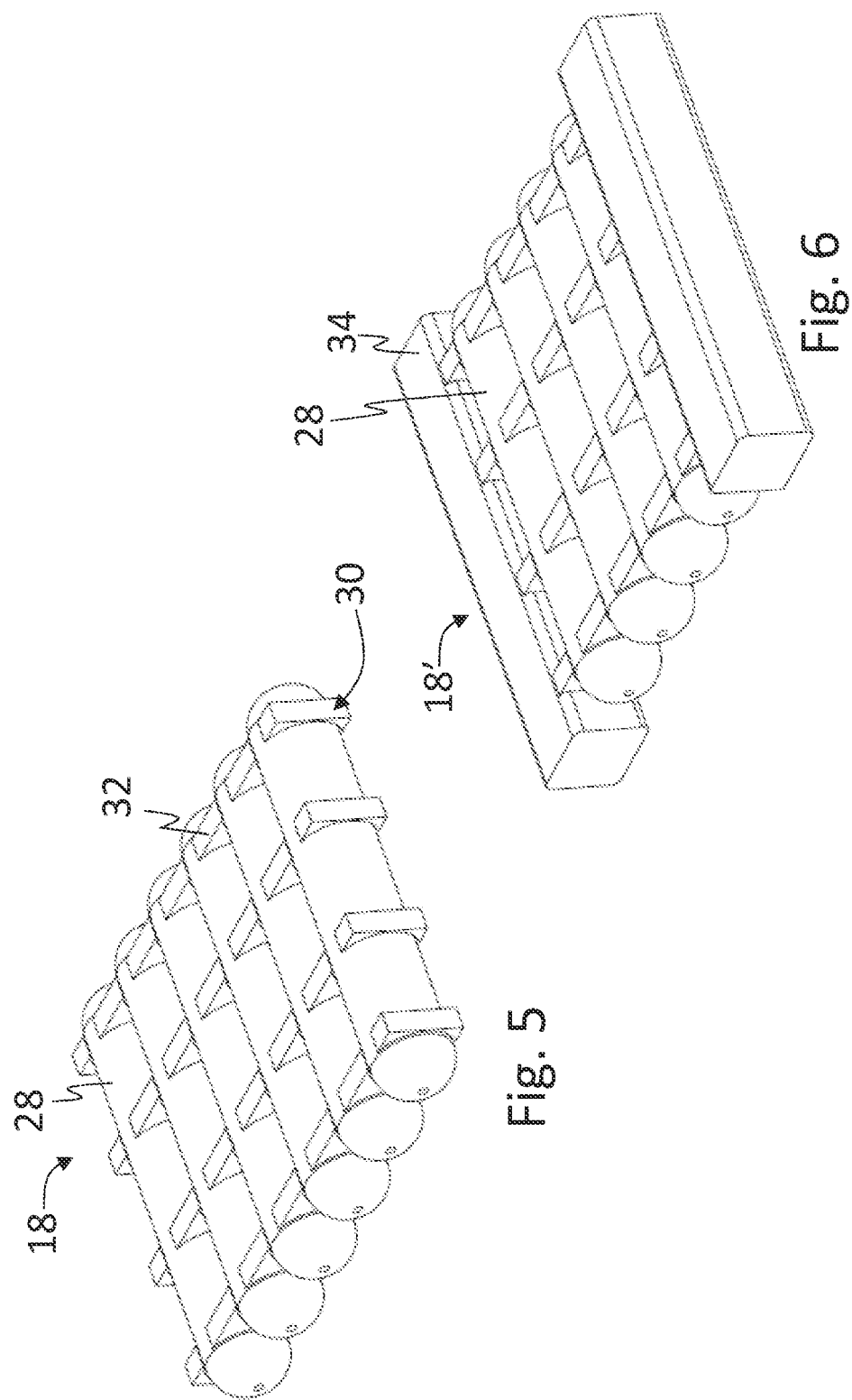

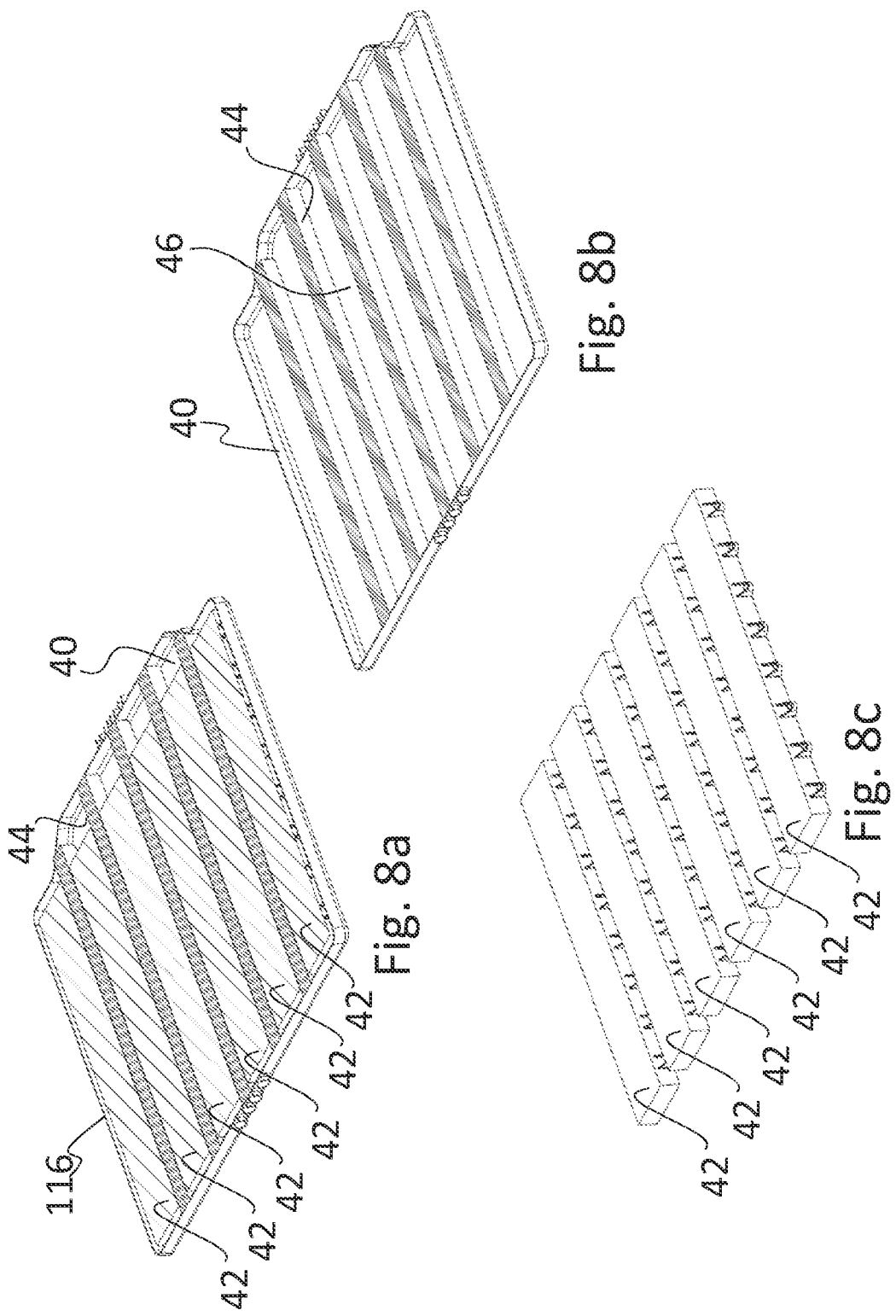

HYDROGEN TANK AND TRACTION BATTERY ARRANGEMENT

RELATED APPLICATION

The present application claims priority to European Patent Application No. 20200298.6, filed on Oct. 6, 2020, and entitled "VEHICLE," which is incorporated herein by reference in its entirety.

TECHNICAL FIELD

The invention relates to a vehicle, in particular a vehicle powered by battery and hydrogen gas.

The vehicle may be a heavy-duty vehicle, such as a truck, a bus or a construction equipment. Although the invention will be described with respect to a truck, the invention is not restricted to this particular vehicle, but may also be used in other vehicles such as passenger cars.

BACKGROUND

Electric vehicles are provided with electric motors which are powered by one or more traction batteries. To provide sufficient energy, i.e. driving range, a large number of battery cells are needed. The number of cells may be hundreds or even thousands of cells, for example depending on the total energy (driving range) desired for the particular vehicle. To safely and efficiently manage the large number of battery cells mounted in an electric vehicle, the battery cells are installed in forms of battery modules. A cluster of cells make up a module. The modules thus protect the cells from external shocks, heat or vibration, etc. In their turn a cluster of module can be united in a traction battery pack. In addition to holding several battery modules, a traction battery pack may also comprise cooling components and electric wiring, etc. Thus, when producing a vehicle, one or more traction battery packs will be installed into (or mounted onto) the vehicle.

Another alternative is the use of hydrogen gas. The chemical energy of the hydrogen may for example, be converted into mechanical energy in an internal combustion engine or into electric energy in fuel cells, in order to propel the vehicle.

The above-mentioned technologies may also be provided together in a vehicle, thus resulting in a hybrid powering of the vehicle.

On trucks, traction battery packs are normally suspended onto the chassis with multiple brackets and are connected to each other with a multitude of cables and connectors. The traction battery packs on trucks may be formed like cubes, suspended from a frame of the chassis. This is an inefficient installation with regard to packaging since you need to hold the cube on the outside of the frame, thus requiring large brackets due to the bending moments. You also need to allow the frame to flex in normal movement, which is why each cube is suspended with bushings, which requires some free "lost" space for relative movement. There are similar concerns for installing hydrogen tanks, which are also normally suspended onto the chassis with multiple brackets and provided with cables and connectors that need to be handled with care.

SUMMARY

An object of the invention is to provide a vehicle, which is powered both by hydrogen gas and by battery, and which alleviates at least some of the drawbacks of known hybrid vehicles. This is achieved by a vehicle according to claim 1.

The invention is based on the insight that by placing one or more traction batteries packs and one or more hydrogen tanks between frame plates of the chassis and tightening them to such a frame plate, a space efficient installation may be obtained which does not require many cables and connectors, and which beneficially contributes to the rigidity of the chassis.

Thus, according to an aspect of the invention, there is provided a vehicle, which comprises:
  a rear end,
  a front end located forwardly of the rear end, wherein a direction extending from the rear end towards the front end or vice versa is defined as a longitudinal direction of the vehicle,
  a chassis extending between the rear end and the front end, the chassis comprising: an upper frame plate having a length, width and thickness, wherein its length extends in the longitudinal direction and its thickness extends in a vertical direction, and a lower frame plate having a length, width and thickness, wherein its length extends in the longitudinal direction and its thickness extends in the vertical direction, wherein the lower frame plate is located parallelly below the upper frame plate, wherein the vehicle further comprises, between the upper frame plate and the lower frame plate,
  a traction battery pack arrangement comprising one or more battery modules,
  a hydrogen tank structure comprising one or more hydrogen tanks,
  wherein the hydrogen tank structure is vertically tightened to said traction battery pack arrangement, so that one of said hydrogen tank structure and said traction battery pack arrangement is located on top of the other,
  wherein at least one of said hydrogen tank structure and said traction battery pack arrangement is tightened to one of said upper and lower frame plates.

By the provision of a vehicle which comprises a hydrogen tank structure on top of a traction battery pack arrangement, or vice versa, arranged between an upper and lower frame plates of a chassis, the advantage of a space-saving and efficient installation is obtainable, without compromising the structural rigidity of the chassis. Furthermore, by tightening the traction battery pack arrangement to the hydrogen tank structure, it is possible to avoid or at least reduce the number of brackets and joints that are needed in known electric vehicles.

It should be understood that in this disclosure a traction battery pack arrangement may in at least some exemplary embodiments comprise a single traction battery pack, while in other exemplary embodiments, the traction battery pack arrangement may comprise two or more traction battery packs. Suitably, in embodiments in which the traction battery pack arrangement comprises two or more traction battery packs, they may be placed on top of each other, thus forming a stack of traction battery packs. In such cases, the traction battery packs may suitably be tightened to each other, thus also avoiding or at least reducing the number of brackets and joints needed in known electric vehicles. It should be understood that in case of two or more traction battery packs, each traction battery pack comprises one or more battery modules.

It should be understood that in this disclosure a hydrogen tank structure, may include one or more hydrogen tanks. In at least some exemplary embodiments, the hydrogen tank structure comprises at least two hydrogen tanks, the hydrogen tanks being placed in a common geometrical plane between the upper and lower frame plates. Thus, the at least two hydrogen tanks may be placed next to each other in a horizontal plane, although not necessarily in contact with each other.

According to at least one exemplary embodiment, the hydrogen tank structure and the traction battery pack arrangement form together with the upper and lower frame plates, an integral load bearing structure of the chassis. This is advantageous, since a supporting wall, or the like, extending between the upper and lower frame plates may be omitted (such a solution would take away space/volume for the hydrogen tanks), and instead the traction battery pack arrangement and the hydrogen tank structure together provide the structural rigidity to the frame plates. In other words, the hydrogen tank structure and the traction battery pack arrangement may effectively fill out the vertical space between the upper and lower frame plates.

According to at least one exemplary embodiment, the hydrogen tank structure is located
- on top of the traction battery pack arrangement, wherein the vehicle comprises fasteners extending from the upper frame plate through the top of the hydrogen tank structure, whereby the hydrogen tank structure is tightened to the upper frame plate, or
- underneath the traction battery pack arrangement, wherein the vehicle comprises fasteners extending from the lower frame plate through the bottom of the hydrogen tank structure, whereby the hydrogen tank structure is tightened to the lower frame plate. By tightening the hydrogen tank structure to at least one of the frame plates a tight contact with the frame plate is achievable.

According to at least one exemplary embodiment, the vehicle comprises fasteners extending from
- the lower frame plate to the bottom of the traction battery pack arrangement when the hydrogen tank structure is located on top of the traction battery pack arrangement, whereby the traction battery pack arrangement is tightened to the lower frame plate, or
- the upper frame plate to the top of the traction battery pack arrangement when the hydrogen tank structure is located underneath the traction battery pack arrangement, whereby the traction battery pack arrangement is tightened to the upper frame plate. Thus, the combined vertical extension of the traction battery pack arrangement and the hydrogen tank structure may extend all the way from the lower frame plate to the upper frame plate, and one of the traction battery pack arrangement and the hydrogen tank structure is tightened to one of the frame plates, and the other one is tightened to the other frame plate. This, further improves the structural rigidity of the chassis. As will be explained elsewhere in this disclosure, it is conceivable to tighten either one or both of the traction battery pack arrangement and the hydrogen tank structure to both frame plates, e.g. by fasteners extending all the way from one of the frame plates to the other one.

However, it should be understood that depending on individual requirements or requests, other configurations are conceivable. For instance, if the vertical distance between the upper and lower frame plates is designed to house a hydrogen tank structure and a traction battery pack arrangement comprising a plurality of traction battery packs, it is conceivable to omit one or more of the traction battery packs. For instance, if a vehicle operator, owner, customer, etc. does not need as much battery energy as would be provided by the plurality of traction battery packs, then the one or more omitted traction battery packs may be replaced by an insert, such as a dummy pack to fill out the vertical space between the frame plates. The traction battery pack arrangement with the reduced number of traction battery packs, or the hydrogen tank structure, could thus be fastened to the insert, and the insert could be fastened to one of the frame plates. Of course, an insert could instead be placed between the traction battery pack arrangement and the hydrogen tank structure. Thus, it should be understood that there are a number of different exemplary embodiments, in which one of the hydrogen tank structure, the traction battery pack arrangement and an insert is located between the other two, wherein the other two are tightened to a respective one of the upper and lower frame plates. As already mentioned above, there may be provided long fasteners which may tighten several parts of the entire assembly to each other.

It should be understood that in this disclosure the vertical direction is perpendicular to the ground on which the vehicle stands. In other words, a vertical direction coincides or is parallel to the yaw axis of the vehicle. Thus, the fact that the hydrogen tank structure is vertically tightened to the traction battery pack arrangement means that the traction battery pack arrangement is located above or below the hydrogen tank structure. Similarly, in embodiments in which the traction battery pack arrangement comprises a stack of traction battery packs, and individual traction battery pack which is vertically tightened to one or more neighbouring traction battery pack(s) is thus tightened to a traction battery pack or packs which is/are located above and/or below said individual traction battery pack.

It should also be understood that the longitudinal direction of the vehicle coincides or is parallel with the roll axis of the vehicle. The width or lateral direction of the vehicle coincides or is parallel with the pitch axis of the vehicle. As regards the dimensions of the upper frame plate and the lower frame plate it should be understood that the length is larger than the width, and the width is larger than the thickness.

As already indicated above, according to at least one exemplary embodiment, the vehicle comprises fasteners extending all the way from the lower frame plate, through the traction battery pack arrangement and the hydrogen tank structure, and to the upper frame plate. This may be advantageous since such a long fastener may provide a firm clamping of the parts between the upper and lower frame plates.

According to at least one exemplary embodiment, the hydrogen tank structure comprises a support in which a plurality of hydrogen tanks are provided, wherein the support comprises reinforcement structures for receiving tightening fasteners extending from the upper frame plate, from the lower frame plate, and/or from the traction battery pack arrangement. An advantage of this is that the support may have multiple functionality, such as supporting/protecting the hydrogen tanks, and also functioning as a means for facilitating the tightening of the hydrogen tank structure to the neighbouring traction battery pack arrangement and/or to the upper and/or lower frame plate.

The reinforcement structures of the support of the hydrogen tank structure may suitably be formed by a material goods portion into which (or even through which) the fasteners may be driven. The material goods portion may suitably be provided with a bore hole, such as a threaded bore hole, whereby a threaded portion of the fasteners may engage with the internal threads of the bore hole. However, it should be noted that the fasteners may be self-drilling, i.e. not needing any bore hole in the reinforcement structure, and/or they may be self-tapping, i.e. not needing any mating threads in any bore-hole through the reinforcement structure.

According to at least one exemplary embodiment, said reinforcement structures comprise concave surfaces for receiving the hydrogen tanks. Since hydrogen tanks are normally cylindrical, a concave surface is well suited for supporting the hydrogen tanks. It should be noted, that irrespective of the support having concave surfaces or not, the support may also be used for containing/supporting other items, such as cooling elements, auxiliary batteries for computers and control units, air tanks for suspension system, etc.

According to at least one exemplary embodiment, the hydrogen tank structure has a length, a width and a height, wherein its height extends in the vertical direction and is smaller than each one of its length and its width. Thus, understandably, the length of the hydrogen tank structure may be larger than its width, which in turn is larger than its height. This is advantageous as it may fit well between the traction battery pack arrangement and one of the upper and lower frame plates of the vehicle chassis, without increasing the overall bulkiness of the chassis. The relatively low height allows for the hydrogen tank structure to fit in the available space, while still providing large amount of hydrogen gas which in fuel cells may be converted into electric energy.

Similarly, according to at least one exemplary embodiment, the traction battery pack arrangement has a length, a width and a height, wherein its height extends in the vertical direction and is smaller than each one of its length and its width. This too provides the advantage of a relatively low height, while still providing large amount of stored energy, since the width and length of the traction battery pack arrangement enables a large number of battery cells to be provided and appropriately enclosed, even though the height is limited.

As already mentioned above, the traction battery pack arrangement may comprise:
 a single traction battery pack containing one or more battery modules, or
 a battery stack in which two or more of traction battery packs are stacked on top of each other such that each traction battery pack is vertically tightened to a neighbouring traction battery pack, wherein at least one traction battery pack is tightened to the hydrogen tank structure, wherein each traction battery pack in the battery stack contains one or more battery modules.
Thus, in the case of a single traction battery pack, it may be connected to both the hydrogen tank structure and to one of the upper and lower frame plates. In the case of a battery stack, then one traction battery pack (such as an uppermost or lowermost pack) may be connected to the hydrogen tank structure and another one (e.g. lowermost or uppermost pack) may be connected to one of the upper and lower frame plates.

As explained in the background section of this disclosure, a plurality of battery cells may be provided in a common battery module, which protects the battery cells. A traction battery pack may comprise a plurality of such battery modules, and may also comprise additional features such as cooling components, electric wirings, etc. Such a modular structure is at least partly reflected in the following exemplary embodiments.

Thus, according to at least one exemplary embodiment (irrespective of the traction battery pack arrangement having a single traction battery pack or a battery stack with at least two traction battery packs), each traction battery pack of the one or more traction battery packs may comprise a tray in which a plurality of battery modules are provided, wherein the tray comprises reinforcement structures for receiving tightening fasteners extending from the upper frame plate, from the lower frame plate, from another traction battery pack and/or from the hydrogen tank structure. An advantage of this is that the tray may have multiple functionality, such as functioning as a support/protection to the battery modules, and also functioning as a means for facilitating the tightening of the traction battery pack to the neighbouring traction battery pack.

The reinforcement structures of the tray of the traction battery pack may suitably be formed by a material goods portion into which (or even through which) the fasteners may be driven. The material goods portion may suitably be provided with a bore hole, such as a threaded bore hole, whereby a threaded portion of the fasteners may engage with the internal threads of the bore hole. However, it should be noted that the fasteners may be self-drilling, i.e. not needing any bore hole in the reinforcement structure, and/or they may be self-tapping, i.e. not needing any mating threads in any bore-hole through the reinforcement structure.

According to at least one exemplary embodiment, said reinforcement structures of the tray of the traction battery pack comprise ribs extending across the tray and forming individual compartments for each battery module. Thus, the ribs may have the function of partition walls, suitably spaced from each other at a distance substantially corresponding to a dimension (such as a width) of an individual battery module. In addition to compartments for each battery module, the ribs may also form one or more compartments for auxiliary components such as cooling cables and electric wires, etc.

In exemplary embodiments in which the traction battery pack arrangement comprises said battery stack, each traction battery pack may be plate-shaped and have a length, a width and a thickness, wherein the thickness of each traction battery pack is smaller than its length and smaller than its width, wherein the thickness extends in the vertical direction, such that the battery stack comprises a stack of horizontal flat traction battery packs. Similarly, in exemplary embodiments in which the traction battery pack arrangement comprises a single traction battery pack, that traction battery pack may be plate-shaped and have a length, a width and a thickness, wherein the thickness of the traction battery pack is smaller than its length and smaller than its width, wherein the thickness extends in the vertical direction. Thus, from the above exemplary embodiments, it is understood that the plate-shaped traction battery pack(s) provide(s) a compact arrangement.

According to at least one exemplary embodiment, the vehicle comprises
 a power control unit,
 an electric motor, and
 a high voltage cable for transferring battery power and or hydrogen fuel cell power from the power control unit to the electric motor,
wherein the traction battery pack arrangement is electrically connected to the power control unit,
wherein the hydrogen tank structure is fluidly connected to the power control unit, wherein the power control unit is located between the upper and lower frame plates.

By also providing the power control unit between the upper and lower frame plates, a compact installation is achievable. Long cables may be omitted. Suitably, the power control unit, the traction battery pack arrangement and the hydrogen tank structure may be located close to each other, and suitably within a common outer casing. Thus, according to at least one exemplary embodiment, the power control unit is located within a casing which encloses the traction battery pack arrangement and the hydrogen tank structure.

According to at least one exemplary embodiment, the power control unit comprises an electrical centre to which the traction battery pack arrangement is connected via a high voltage connector, and a fuel cell centre to which the hydrogen tank structure is connected via a fluid connector. This too allows for a compact assembly.

In exemplary embodiments in which the traction battery pack arrangement comprises a battery stack having two or more traction battery packs on top of each other, different electrical connector solutions may be conceivable. For instance, according to at least one exemplary embodiment, each traction battery pack of the battery stack may be connected directly to the power control unit at a front or rear end of the above-mentioned casing. Thus, the power control unit may suitably be located in front of or behind the battery stack, as seen in the longitudinal direction of the vehicle. Accordingly, any connector of the battery stack may suitably be facing in the front or rear direction towards the power control unit, which enables a compact installation, without the need for many and long cables. Similarly, the fluid connector of the hydrogen tank stack may suitably be facing in the front or rear direction towards the power control unit. According to at least one exemplary embodiment, each traction battery pack of the battery stack may all be connected to the power control unit by a common connector. This further provides for a compact and efficient installation. In other exemplary embodiments, each traction battery pack may have an individual respective connector to the power control unit. According to at least one exemplary embodiment, a common connector may be provided on the lowermost traction battery pack of the battery stack, wherein the other traction battery packs are electrically connected to the lowermost traction battery pack of the battery stack. In such cases the lowermost traction battery pack may, for instance, be of a different dimension than the other traction battery packs. For instance, the lowermost traction battery pack may be larger in at least one direction, such as in the length direction of the vehicle. The power control unit may suitably be placed on top of the lowermost traction battery pack and the common connector.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 3 is a schematic illustration of a traction battery pack arrangement and a hydrogen tank structure connected to a power control unit, which may be provided on a vehicle in accordance with at least one exemplary embodiment of the invention.

FIG. 4 is a schematic illustration of a traction battery pack arrangement and a hydrogen tank structure connected to a power control unit, which may be provided on a vehicle in accordance with at least one other exemplary embodiment of the invention.

FIG. 5 is a schematic illustration of the hydrogen tank structure in FIG. 3.

FIG. 6 is a schematic illustration of the hydrogen tank structure in FIG. 4.

FIGS. 8*a*-8*c* schematically illustrate interior contents of a traction battery pack, which may form part of a traction battery pack arrangement, in accordance with at least one exemplary embodiment of the invention.

DETAILED DESCRIPTION

Figure 1:
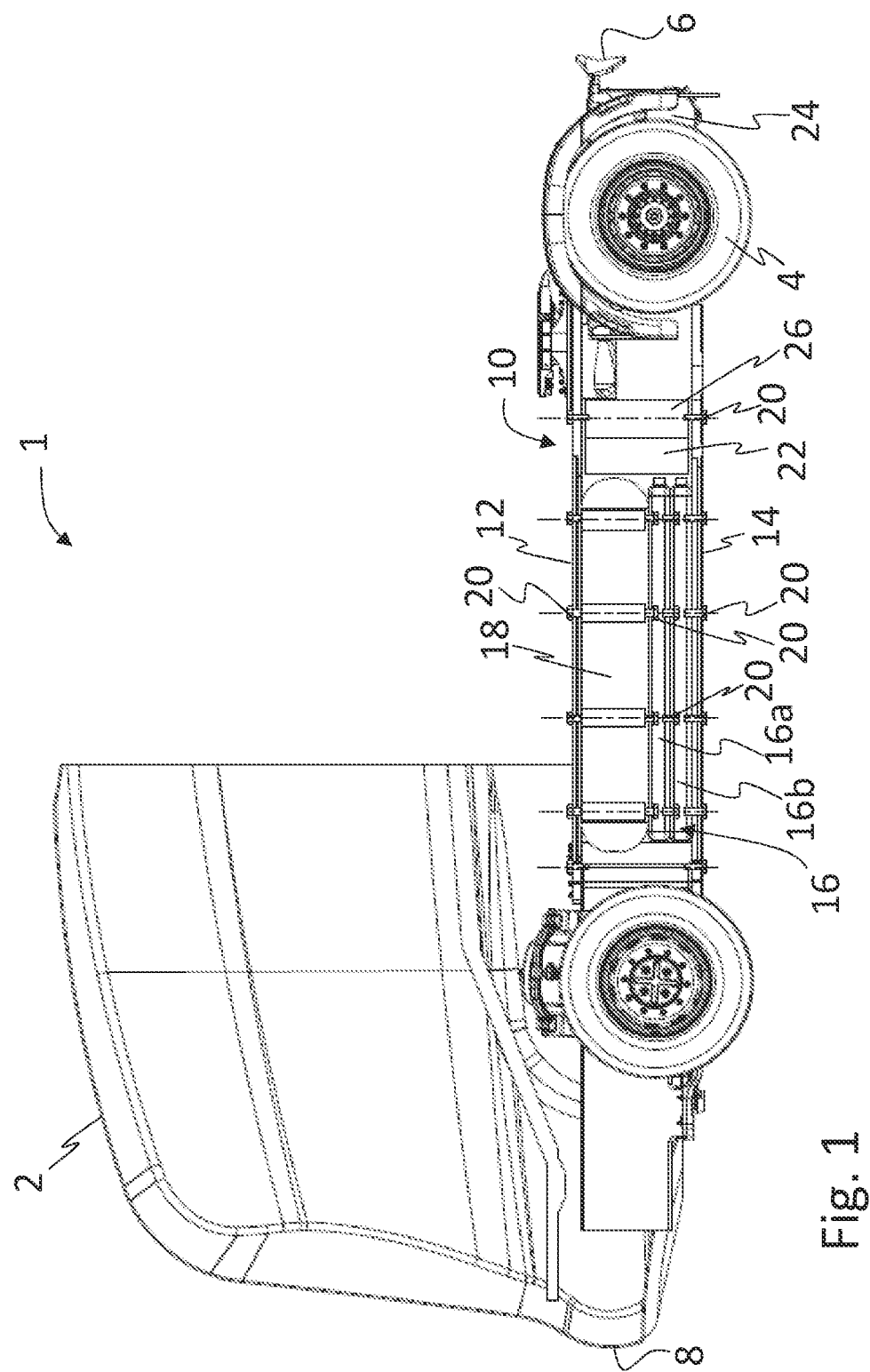
FIG. 1 is a schematic illustration of a vehicle according to at least one exemplary embodiment of the invention.

FIG. 1 is a schematic illustration of a vehicle 1 according to at least one exemplary embodiment of the invention. Although the vehicle 1 is illustrated in the form of a truck, other types of vehicles, such as busses, construction equipment or passenger cars may be provided in accordance with the invention.

The truck 1 (vehicle) comprises a cab 2 in which a driver may operate the vehicle 1. However, the invention may also be implemented in autonomous vehicles. The vehicle 1 comprises a number of road wheels 4, herein illustrated as two pairs of wheels, however in other embodiments there may be a different number of wheels, such as three pairs, four pairs or more.

The vehicle 1 has a rear end 6 and a front end 8 located forwardly of the rear end 6. A direction extending from the rear end 6 towards the front end 8, or vice versa, is defined as the longitudinal direction of the vehicle 1. A chassis 10 extends between the rear end 6 and the front end 8. The chassis 10 comprises an upper frame plate 12 and a lower frame plate 14 which is located vertically below the upper frame plate 12. Each one of the upper frame plate 12 and the lower frame plate 14 has a length, a width and a thickness. The length extends in the longitudinal direction of the vehicle 1. The thickness extends in the vertical direction. The width extends in a direction perpendicular to both the longitudinal and the vertical directions, i.e. perpendicular to the plane of the drawing.

A traction battery pack arrangement 16 comprising a plurality of traction battery packs, here illustrated as two traction battery packs 16*a*-16*b*, stacked on top of each other. It should, however, be understood that the traction battery pack arrangement 16 may, have a different number of traction battery packs, such as three or more traction battery packs, or just a single traction battery pack. A hydrogen tank structure 18 is located on top of the traction battery pack arrangement 16. It is, however, conceivable to instead provide the traction battery pack arrangement 16 on top of the hydrogen tank structure 18. The traction battery pack arrangement 16 and the hydrogen tank structure 18 are provided between the upper frame plate 12 and the lower frame plate 14. The traction battery pack arrangement 16 is vertically tightened to the hydrogen tank structure 18. In the illustration it is the uppermost traction battery pack 16*a* which is tightened by means of fasteners 20 to the hydrogen tank structure 18. Furthermore, as illustrated each traction battery pack 16a-16b may be vertically tightened to its neighbouring traction battery pack 16a-16b by corresponding fasteners 20. At least one of the traction battery pack arrangement 16 and the hydrogen tank structure 18 is tightened to one of the upper frame plate 12 and the lower frame plate 14. In the illustrated example, the hydrogen tank structure 18 is tightened to the upper frame plate 12 by means of fasteners 20, and the traction battery pack arrangement 16 (more specifically, the lowermost traction battery pack 16b) is tightened to the lower frame plate 14 by means of fasteners 20. It should, however, be understood that other tightening solutions may be conceivable. For instance, if it is not considered necessary to have two traction battery packs 16a-16b in the vehicle 1 illustrated in FIG. 1, then if one would be removed, there would be an empty volume. In such case an insert, such as a dummy pack, may be provided below the remaining traction battery pack, and that insert could be tightened to the lower frame plate 14. The fasteners 20 discussed herein may, for instance, be screws or bolts.

It may be noted that in the illustrated exemplary embodiment, the uppermost traction battery pack 16a is, in addition to being tightened by fasteners 20 to the hydrogen tank structure 18, also tightened by fasteners 20 to its below neighbouring traction battery pack 16b. Similarly, the lowermost traction battery pack 16b is, in addition to being tightened by fasteners 20 to the lower frame plate 14 also tightened by fasteners 20 to its above neighbouring traction battery pack 16a.

It will be appreciated that because the traction battery pack arrangement 16 and the hydrogen tank structure 18 fill up the space between the upper frame plate 12 and the lower frame plate 14, they provide support and rigidity to the chassis 10. Accordingly, the traction battery pack arrangement 16 and the hydrogen tank structure 18 form, together with the upper and lower frame plates 12, 14, an integral load bearing structure of the chassis 10.

FIG. 1 also illustrates a power control unit 22 located rearwardly of the traction battery pack arrangement 16 and the hydrogen tank structure 18. Further rearwardly there is provided an electric motor 24 for propelling the vehicle 1. The traction battery pack arrangement 16 is electrically connected to the power control unit 22, and the hydrogen tank structure 18 is fluidly connected to the power control unit 22. The power control unit 22 comprises an electrical centre to which the traction battery pack arrangement 16 is connected via a high voltage connector, and a fuel cell centre to which the hydrogen tank structure 18 is connected via a fluid connector. The power control unit 22 is similarly to the traction battery pack arrangement 16 and the hydrogen tank structure 18 located between the upper frame plate 12 and the lower frame plate 14.

Power may be transferred from the power control unit 22 to the electric motor 24 via a high voltage cable. The power control unit 22 may suitably be located within a casing 26 which encloses the traction battery pack arrangement 16 and the hydrogen tank structure 18, thus, it may be a common casing 26 enclosing all three features (i.e. traction battery pack arrangement 16, hydrogen tank structure 18 and power control unit 22).

In the exemplary embodiment of FIG. 1, a plurality of relatively short fasteners 20 are provided. Each fastener 20 is illustrated as connecting two parts, such as two traction battery packs 16a-16b, or a traction battery pack 16b and the lower frame plate 14, or a traction battery pack 16a and the hydrogen tank structure 18, or the hydrogen tank structure 18 and the upper frame plate 12. It should, however, be understood that longer fasteners may be provided which span over more than two parts, such as three or more parts, or even all of the parts from the upper to the lower frame plates 12, 14. The latter case is illustrated in FIG. 2.

Figure 2:
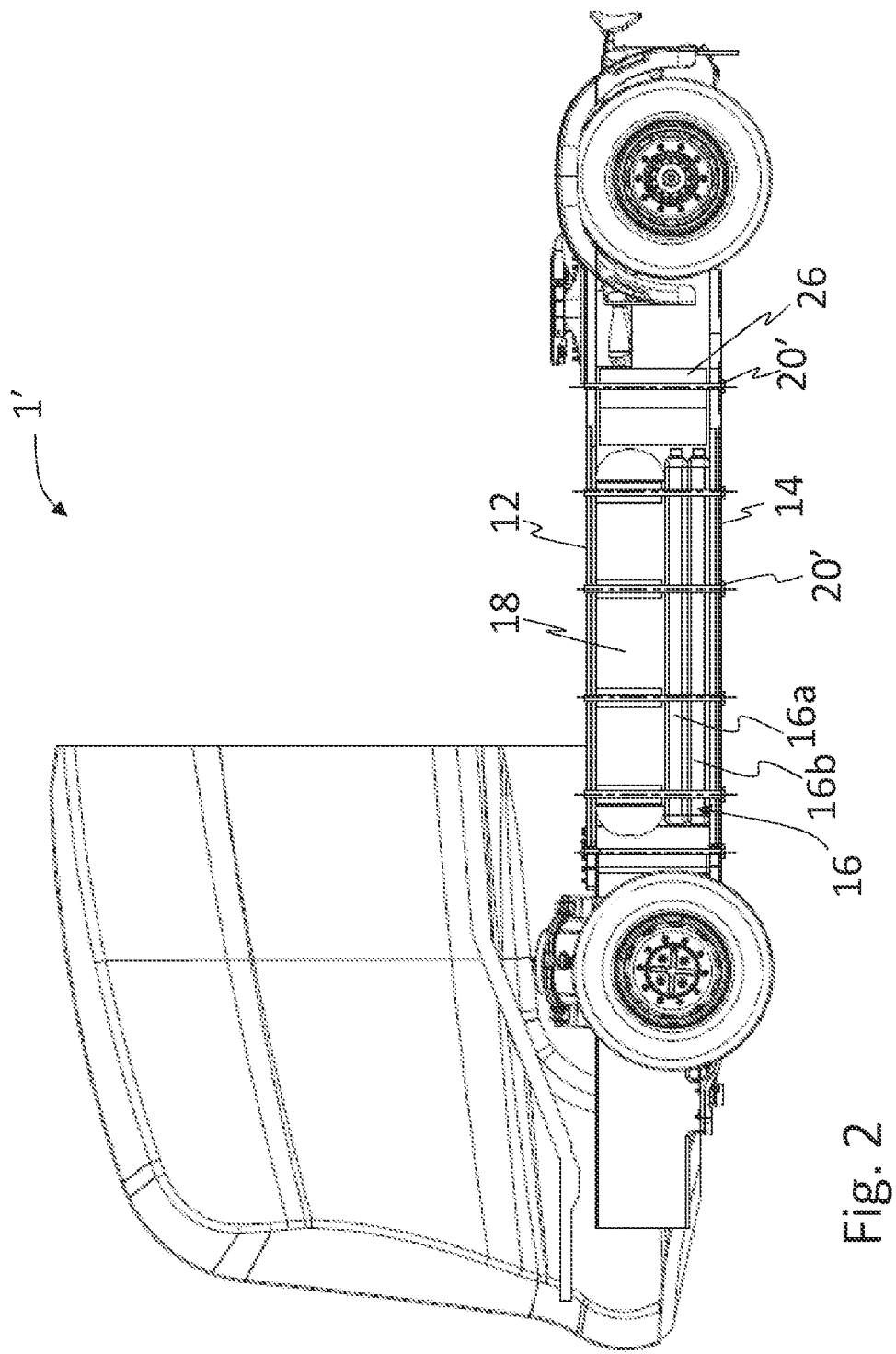
FIG. 2 is a schematic illustration of a vehicle according to at least one other exemplary embodiment of the invention.

Thus, turning to FIG. 2, there is provided a schematic illustration of a vehicle 1' according to at least one other exemplary embodiment of the invention. The illustrated components and parts may be substantially the same as those illustrated in FIG. 1, except for the short fasteners 20 in FIG. 1. Instead, in the exemplary embodiment of FIG. 2, relatively long fasteners 20' are provided. The fasteners 20' extend from the lower frame plate 14 through the traction battery pack arrangement 16, the hydrogen tank structure, and all the way to the upper frame plate 12. Thus, each traction battery pack 16a-16b of the traction battery pack arrangement 16 becomes tightened to its neighbouring traction battery pack 16a-16b, and the uppermost and lowermost traction battery packs 16a-16b become tightened to the hydrogen tank structure 18 and the lower frame plate 14, respectively. Put differently, the assembly as a whole (i.e. the traction battery pack arrangement 16 and the hydrogen tank structure 18) is tightened to the upper frame plate 12 and the lower frame plate 14 by means of the long fasteners 20'. Suitably, the whole assembly may be subjected to a clamping force from the upper and lower frame plates 12, 14, being tightened by the long fasteners 20'.

From the above, it is clear that in both exemplary embodiments of FIG. 1 and FIG. 2, there are fasteners 20, 20' extending from the lower frame plate 14, through the bottom of the traction battery pack arrangement 16 (more particularly the bottom of the lowermost traction battery pack 16b), whereby the traction battery pack arrangement 16 is tightened to the lower frame plate 14. Correspondingly, in both exemplary embodiments of FIG. 1 and FIG. 2, there are fasteners 20, 20' extending from the upper frame plate 12, through the top of the hydrogen tank structure 18, whereby the hydrogen tank structure 18 is tightened to the upper frame plate 12. In this connection, it should be understood that in this disclosure terms such as "extending from" and "extending to" do not imply any particular orientation of the fasteners. For instance, in case of a fastener 20, 20' being in the form of a screw having a screw head and a shaft, the screw head may be located at either one of the parts, be it the part from which the fastener 20, 20' is said to extend, or the part to which the fastener 20, 20' is said to extend. Thus, in the illustration in FIG. 2 although heads of the fasteners 20' are indicated as located at the lower frame plate 14, the fasteners 20' can still be said to extend from the upper frame plate 12 to the lower frame plate 14. Furthermore, it should be understood that the illustrated orientations in FIG. 1 and FIG. 2 are only exemplary, and one or more of the fasteners 20, 20' could instead be provided in the opposite orientation.

As illustrated in FIGS. 1 and 2, fasteners 20, 20' may also be used to fixate the casing 26 to the upper and lower frame plates 12, 14.

FIG. 3 is a schematic illustration of a traction battery pack arrangement 16 and a hydrogen tank structure 18 connected to a power control unit 22, which may be provided on a vehicle in accordance with at least one exemplary embodiment of the invention. Thus, it may for example correspond to the traction battery pack arrangement 16, the hydrogen tank structure 18 and the power control unit 22 illustrated in FIG. 1 and/or FIG. 2.

Another example is illustrated in FIG. 4. Thus, FIG. 4 is a schematic illustration of a traction battery pack arrangement 16 and a hydrogen tank structure 18' connected to a power control unit, which may be provided on a vehicle in accordance with at least one other exemplary embodiment of the invention. Thus, the hydrogen tank structure 18' may for instance replace the hydrogen tank structure 18 illustrated in FIG. 1 and/or FIG. 2.

Figure 7:
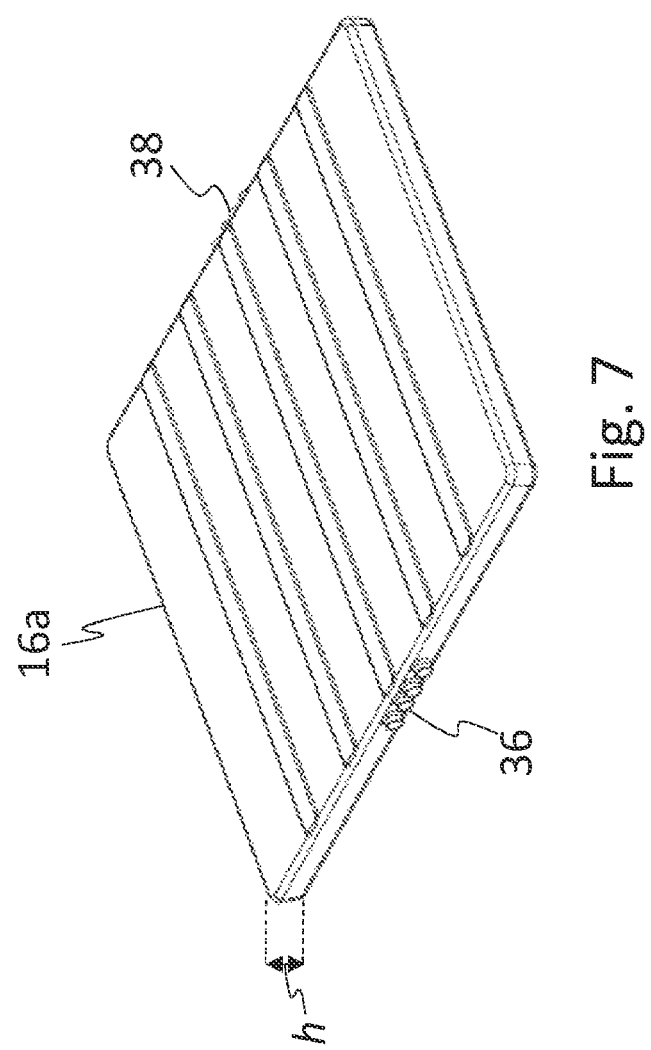
FIG. 7 is a schematic illustration of a traction battery pack which may form part of the traction battery pack arrangement in either one of FIGS. 3 and 4.

FIG. 5 is a schematic illustration of the hydrogen tank structure 18 in FIG. 3, while FIG. 6 is a schematic illustration of the hydrogen tank structure 18' in FIG. 4. Furthermore, FIG. 7 is a schematic illustration of a traction battery pack 16a which may form part of the traction battery pack arrangement 16 in either one of FIGS. 3 and 4.

The hydrogen tank structure 18 illustrated in FIG. 3 and FIG. 5 includes a plurality of hydrogen tanks 28, herein illustrated as six hydrogen tanks 28. However, in other exemplary embodiments there may be more or fewer hydrogen tanks. The hydrogen tank structure 18 comprises a support 30 in which a plurality of hydrogen tanks 28 are provided. The support comprises reinforcement structures 32 for receiving tightening fasteners extending from the upper frame plate, from the lower frame plate, and/or from the traction battery pack arrangement 16. In the illustrated example, the support 30 forms a plurality of receiving cavities by means of the reinforcement structures 32. In particular, the reinforcement structures comprise concave surfaces for receiving the hydrogen tanks 28. The curvature of the concave surfaces may suitably substantially correspond to the curvature of the enveloping surface of the hydrogen tanks 28. The enveloping surface may normally be cylindrical.

It should be understood that other designs and configurations of the support 30 and reinforcement structures 32 are conceivable. For instance, in the example, along each hydrogen tank 28, the reinforcement structures 32 are spaced from each other. In other exemplary embodiments, there may be continuous reinforcement structures along each hydrogen tank 28.

Compared to the hydrogen tank structure 18 illustrated in FIG. 3 and FIG. 5, in the hydrogen tank structure 18' illustrated in FIG. 4 and FIG. 6, the two outermost hydrogen tanks have been replaced by housings 34 for containing/supporting other items, such as cooling elements, auxiliary batteries for computers and control units, air tanks for suspension system, etc. In other words, in at least some exemplary embodiments a hydrogen tank structure 18' may comprise/contain/support other items than just hydrogen tanks 28. Accordingly, in at least some exemplary embodiments, the hydrogen tank structure 18, 18' comprises at least one hydrogen tank 28.

Turning now to FIG. 7, there is illustrated a traction battery pack 16a which may form part of the battery stacks that make up the traction battery pack arrangements 16 shown in the previously discussed figures. Thus, the traction battery pack 16a in FIG. 7 may correspond to either one of the traction battery packs 16a-16b in FIGS. 1-4.

As can be seen in FIGS. 3, 4 and 7, each traction battery pack 16a-16b has a number of input areas 36 for receiving cooling cables, electric wires etc. In FIG. 7 it can be seen that on the opposite side of the traction battery pack 16a there is provided output areas 38 (similar output areas are present on the traction battery packs 16a-16b in FIGS. 3-4 although not visible in the illustrations). Such output areas 38 may include connectors for connecting each traction battery pack 16a-16b, directly to the power control unit 22.

Thus, it should be understood that in some exemplary embodiments, each one of the traction battery packs 16a-16b in FIGS. 3-4 will be individually connected to the power control unit 22. However, in other exemplary embodiment, the traction battery packs 16a-16b in FIGS. 3-4 are all connected to the power control unit 22 by a common connector. For example, the common connector may be provided on the lowermost traction battery pack 16b, wherein the other traction battery pack 16a is electrically connected to the lowermost traction battery pack 16b. Although not illustrated in FIGS. 3-4, in some exemplary embodiments, the lowermost traction battery pack 16b, being provided with said common connector, may extend beyond the other traction battery pack 16a in the longitudinal direction, and the power control unit 22 may, for instance, be arranged on top of the extended portion of the lowermost traction battery pack 16b.

The extension of the traction battery pack arrangement 16 in the vertical direction, is suitably smaller than in the longitudinal or lateral direction of the vehicle. This gives a less bulky impression than prior art cube-shaped battery solutions. Thus, the height (may also be referred to as the thickness) of the traction battery pack arrangement 16 is smaller than each one of its length and its width (the height/thickness of the traction battery pack extends in the vertical direction).

Furthermore, each individual traction battery pack 16a-16b may have a very small vertical extension. This is for instance indicated in FIG. 7. The height h (may also be referred to as the thickness) of the individual traction battery pack 16a is smaller than its length and its width. Indeed, the traction battery pack 16a may be substantially plate-shaped. Thus, the traction battery pack 16a may be considered as being a flat component. Thus, the battery stack which makes up the traction battery pack arrangement 16 in FIGS. 3-4 comprises a stack of horizontal flat traction battery packs 16a-16b. The height/thickness of each traction battery pack may suitably be in the range of 70-130 mm, such as 80-120 mm, typically 90-110 mm.

FIGS. 8a-8c schematically illustrate interior contents of a traction battery pack 116, which may form part of a traction battery pack arrangement, in accordance with at least one exemplary embodiment of the invention.

Thus, FIG. 8a may illustrate a cross-sectional or cut-away view of a traction battery pack 116, such as the type or similar to the type of traction battery packs 16a-16b illustrated in the previous figures, wherein a top portion of the traction battery pack 116 has been cut away. FIG. 8a illustrates that the traction battery pack 116 comprises a tray 40 in which a plurality of battery modules 42 are provided. The tray 40 without the battery modules 42 is illustrated in FIG. 8b, while the actual battery modules 42 are illustrated in FIG. 8c.

As can be seen in FIG. 8a and FIG. 8b, the tray 40 comprises reinforcement structures 44, here illustrated as ribs or partition walls. The reinforcement structures 44 may be formed in one piece with the main part of the tray 40, or as separate pieces which are connected to the tray 40, such as by welding, gluing or by mechanical fastening means. The reinforcement structures 40 can receive tightening fasteners, such as the previously discussed fasteners 20, 20' in FIGS. 1 and 2. Depending on the location of the specific traction battery pack 116 in the battery stack, such fasteners 20, 20' may tighten the traction battery pack 116 to one of the frame plates 12, 14, to the hydrogen tank structure 18 and/or to one or more other traction battery packs 16a-16b.

The reinforcement structures 44 extend across the tray 40 and form individual compartments 46 for each battery module 42. Accordingly, any fastener 20, 20' that penetrates into the traction battery pack 116, does in fact penetrate into a reinforcement structure 44, not into a battery module 42.

In the present illustration six compartments 46 are illustrated for receiving six battery modules 42. However, it should be understood that other number of compartments 46 and battery modules 42 are equally conceivable, be it a lower or a higher number. It should further be understood that one or more of the compartments 46 may contain other components (such as electrical or cooling components), instead of the shown battery module 42.

It is to be understood that the present invention is not limited to the embodiments described above and illustrated in the drawings; rather, the skilled person will recognize that many changes and modifications may be made within the scope of the appended claims.

The invention claimed is:

1. A vehicle, comprising:
a rear end,
a front end located forward of the rear end, a direction extending from the rear end towards the front end or vice versa is defined as a longitudinal direction of the vehicle,
a chassis extending between the rear end and the front end, the chassis comprising:
an upper frame plate having a length, a width, and a thickness, wherein the length extends in the longitudinal direction and the thickness extends in a vertical direction, and
a lower frame plate having a length, a width, and a thickness, wherein the length extends in the longitudinal direction and the thickness extends in the vertical direction,
wherein the lower frame plate is located parallelly below the upper frame plate,
wherein the vehicle further comprises, between the upper frame plate and the lower frame plate,
a traction battery pack arrangement comprising one or more battery modules, and
a hydrogen tank structure comprising one or more hydrogen tanks,
wherein the hydrogen tank structure is vertically fastened to the traction battery pack arrangement, so that one of the hydrogen tank structure and the traction battery pack arrangement is located on top of the other, and
wherein at least one of the hydrogen tank structure and the traction battery pack arrangement is fastened to one of the upper and lower frame plates.

2. The vehicle of claim 1, wherein the hydrogen tank structure and the traction battery pack arrangement form an integral load bearing structure of the chassis together with the upper and lower frame plates.

3. The vehicle of claim 1, wherein the hydrogen tank structure is located on top of the traction battery pack arrangement, wherein the vehicle comprises fasteners extending from the upper frame plate through a top of the hydrogen tank structure, whereby the hydrogen tank structure is fastened to the upper frame plate, or underneath the traction battery pack arrangement, wherein the vehicle comprises fasteners extending from the lower frame plate through a bottom of the hydrogen tank structure, whereby the hydrogen tank structure is fastened to the lower frame plate.

4. The vehicle of claim 3, comprising fasteners extending from the lower frame plate to the bottom of the traction battery pack arrangement when the hydrogen tank structure is located on top of the traction battery pack arrangement, whereby the traction battery pack arrangement is fastened to the lower frame plate, or the upper frame plate to the top of the traction battery pack arrangement when the hydrogen tank structure is located underneath the traction battery pack arrangement, whereby the traction battery pack arrangement is fastened to the upper frame plate.

5. The vehicle of claim 1, comprising fasteners extending from the lower frame plate, through the traction battery pack arrangement and the hydrogen tank structure, and to the upper frame plate.

6. The vehicle of claim 1, wherein the hydrogen tank structure comprises a support in which a plurality of hydrogen tanks are provided, wherein the support comprises reinforcement structures for receiving tightening fasteners extending from the upper frame plate, from the lower frame plate, and/or from the traction battery pack arrangement.

7. The vehicle of claim 6, wherein the reinforcement structures comprise concave surfaces for receiving the hydrogen tanks.

8. The vehicle of claim 1, wherein the hydrogen tank structure has a length, a width, and a height, and wherein the height extends in the vertical direction and is smaller than each of the length and the width.

9. The vehicle of claim 1, wherein the traction battery pack arrangement has a length, a width, and a height, and wherein the height extends in the vertical direction and is smaller than each of the length and the width.

10. The vehicle of claim 1, wherein the traction battery pack arrangement comprises:
a single traction battery pack containing one or more battery modules, or
a battery stack in which two or more traction battery packs are stacked on top of each other such that each traction battery pack is vertically tightened to a neighboring traction battery pack, wherein at least one traction battery pack is fastened to the hydrogen tank structure, and wherein each traction battery pack in the battery stack contains one or more battery modules.

11. The vehicle of claim 10, wherein the single traction battery pack comprises a tray in which a plurality of battery modules are provided, wherein the tray comprises reinforcement structures for receiving tightening fasteners extending from the upper frame plate, from the lower frame plate, from another traction battery pack and/or from the hydrogen tank structure.

12. The vehicle of claim 11, wherein the reinforcement structures comprise ribs extending across the tray and forming individual compartments for each battery module.

13. The vehicle of claim 10, wherein the traction battery pack arrangement comprises the battery stack, wherein each traction battery pack is plate-shaped and has a length, a width, and a thickness, wherein the thickness of each traction battery pack is smaller than the length and smaller than the width, and wherein the thickness extends in the vertical direction, such that the battery stack comprises a stack of horizontal flat traction battery packs.

14. The vehicle of claim 1, comprising:
a power control unit,
an electric motor, and
a high voltage cable for transferring battery power and/or hydrogen fuel cell power from the power control unit to the electric motor,
wherein the traction battery pack arrangement is electrically connected to the power control unit,
wherein the hydrogen tank structure is fluidly connected to the power control unit, and
wherein the power control unit is located between the upper and lower frame plates.

15. The vehicle of claim 14, wherein the power control unit comprises an electrical center to which the traction battery pack arrangement is connected via a high voltage connector, and a fuel cell center to which the hydrogen tank structure is connected via a fluid connector.

\* \* \* \* \*